No. 649,139. Patented May 8, 1900.
G. A. PADDOCK.
HARROW.
(Application filed Apr. 27, 1892.)
(No Model.)
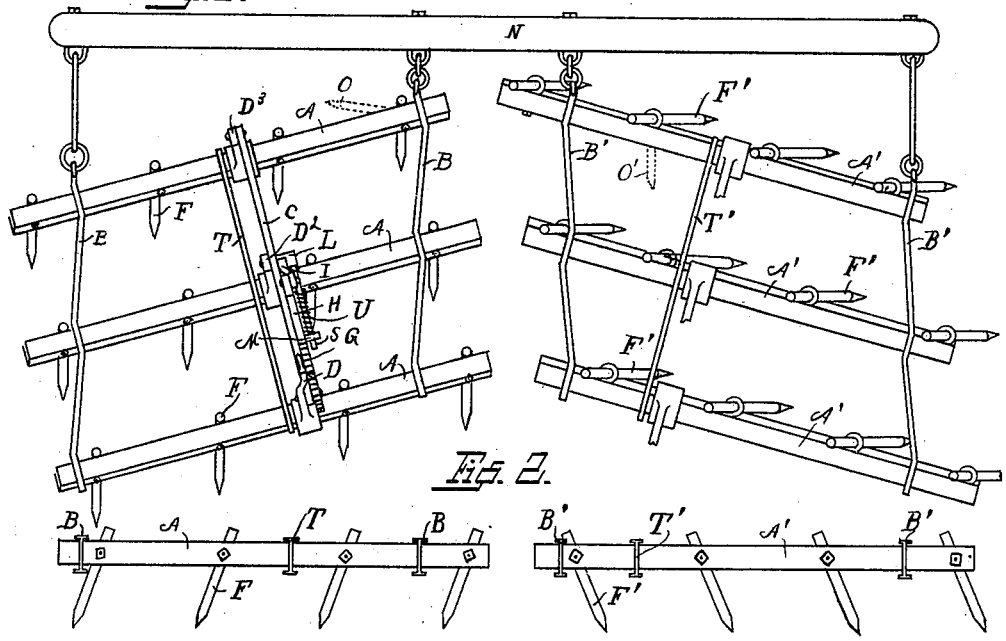
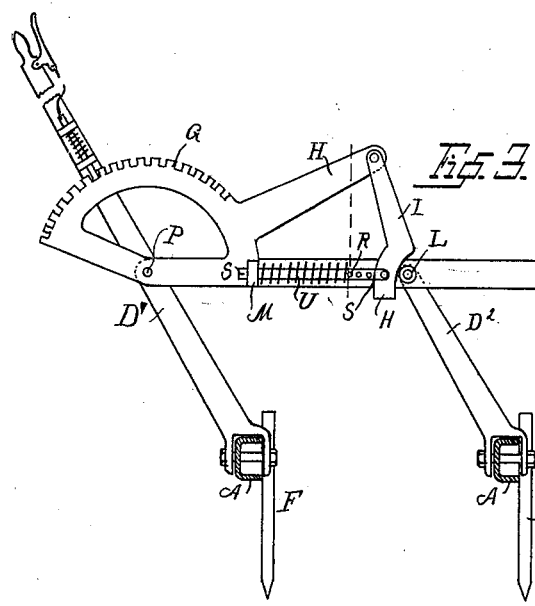
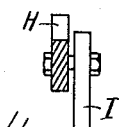
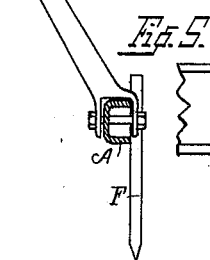
Witnesses.
Inventor.
Gustavus A. Paddock

UNITED STATES PATENT OFFICE.

GUSTAVUS A. PADDOCK, OF BEAVER DAM, WISCONSIN.

HARROW.

SPECIFICATION forming part of Letters Patent No. 649,139, dated May 8, 1900.

Application filed April 27, 1892. Serial No. 430,845. (No model.)

*To all whom it may concern:*

Be it known that I, GUSTAVUS A. PADDOCK, a citizen of the United States, residing at Beaver Dam, in the county of Dodge and State of Wisconsin, have invented a new and useful Improvement in Harrows, of which the following is a specification.

The objects of my invention are, first, to so set the teeth as most efficiently to work the soil; second, to provide the strongest frame possible, and, third, to prevent injury from stone and other obstructions in the soil. Incidentally I also make the implement easier of draft and less liable to either clog or jump. I accomplish these results by the construction illustrated in the accompanying drawings, in which—

Figure 1 is a plan view of the implement, showing plainly the tooth-bars, teeth, and cross-pieces; Fig. 2, a rear view of the tooth-bars and teeth as they appear when tilted forward; and Fig. 3, a side view of the center cross-piece, tilting arrangements, and spring for preventing breakage. Fig. 4 is a rear view of the latch I with the lip turned under the cross-piece C, and Fig. 5 is a view of the bar A in the opening of the cross-bar B.

Similar letters refer to similar parts throughout the several views.

The implement as here shown consists of two independent sections and a draw-bar N, the former being each secured to the latter at two points. The tooth-bars A A and A' A' are U-shaped, with the U lying approximately on its side unless the teeth lie straight back when the open side is down. Said tooth-bars are inclined rearwardly from the central draft-line. The teeth F F and F' F' are secured against the edges of the tooth-bars by eyebolts, the teeth passing through the eyes and the bolts passing through openings in the back side of the bars. The tooth-bars are held by passing through openings E in the cross-bars B and F. The center cross-pieces T and T' cross the tooth-bars at right angles, and thus form braces to the frames.

D', $D^2$, and $D^3$ are the tilting levers, secured to the tooth-bars and center cross-piece in a common and well-known manner, the first being provided with a spring-catch and handle (the latter not fully shown in the drawings) in the usual manner.

G is the toothed segment or plate for receiving and holding the spring-catch and is provided with an arm H, which extends forward just over the pivotal point of the next forward tilting lever. Said segment is hinged to the lever D' and the connecting-bar C at the bolt P. A latch I is hinged to the arm H, and its lower end is adapted to rest upon a roller L, said roller turning upon the bolt which secures the lever $D^2$ to the connecting-bar C. The bearing-point of the latch is so formed that without resisting force a slight pressure on the arm H would cause it to loosen its hold on the roller L; but a bar S is hinged to its lower part, and by means of a spiral spring U, which encircles said bar, pressure is applied, so that the segment G cannot tip forward unless some firm obstruction is met by the teeth. The rear end of the spring rests against a lug M, said lug serving to hold the bar S in place, and its front end rests against a pin R, which passes through the bar S. This pin may be moved as need requires by having different holes in the bar, and thus the amount of pressure on the latch may be regulated as desired. When a firm obstruction is met, the pressure will loosen the latch, so that the plate or segment G will tip forward and the end of the arm H will come down upon the roller L, thus tilting the teeth back sufficiently to pass over without injury, when by means of the handle, with the assistance of the spring, they can easily be put back in a working position. It will be seen that when the segment G is tilted forward by undue strain the spring-catch still holds the handle and segment together, so that unless the catch is purposely sprung up the teeth will be returned to whatever place they occupied before being tilted down by the obstruction. A lip is turned on the lower end of the latch I to catch the lower edge of the connecting-bar C, and thus prevent the segment from tilting back too far. As plainly shown in Fig. 2, the teeth are secured to the bars at an angle nearly corresponding to the angle at which said tooth-bars slant back from the draw-bar, so that when tilted forward they slant directly sidewise, as shown by the dotted line O in the left-hand section and the teeth F' F' in the right-hand section. When the teeth are tilted back, they stand nearly in the position represented by F F in the left-hand section and the dotted line O' in the right-hand section. It will be seen that the bars as shown in the left-hand section are tilted back, while in the right-hand section they are tilted forward.

I claim—

1. A harrow comprising two independent sections attached to a draw-bar, each section containing two or more tooth-bars supplied with rows of teeth, said bars being rearwardly inclined, and the teeth of each section being slanted outwardly from the other section, the bars of each section being hinged to cross-pieces and supplied with tilting levers, said levers being connected at their upper ends by a cross-piece, and each section being supplied with a tilting-handle, said handle being adjustable as to slant, substantially as described.

2. A harrow comprising a section containing two or more tooth-bars hinged to cross-pieces and each supplied with rows of teeth and tilting levers, said levers being connected at their upper ends by a cross-piece, and a tilting-handle adjustably secured to a segment pivoted upon said section, said segment being held in position by a spring-latch.

3. A harrow comprising a section with two or more tooth-bars hinged to cross-pieces and supplied with rows of teeth and tilting levers, said levers being connected at their upper ends by a cross-piece, a notched segment pivoted to said section and held in position by a latch, said latch being held in position by a spring, and a tilting-handle with a spring-catch adapted to engage the notches of said segment.

GUSTAVUS A. PADDOCK.

Witnesses:
G. W. HORTON,
E. C. PRATT.